United States Patent Office 3,559,022
Patented Jan. 26, 1971

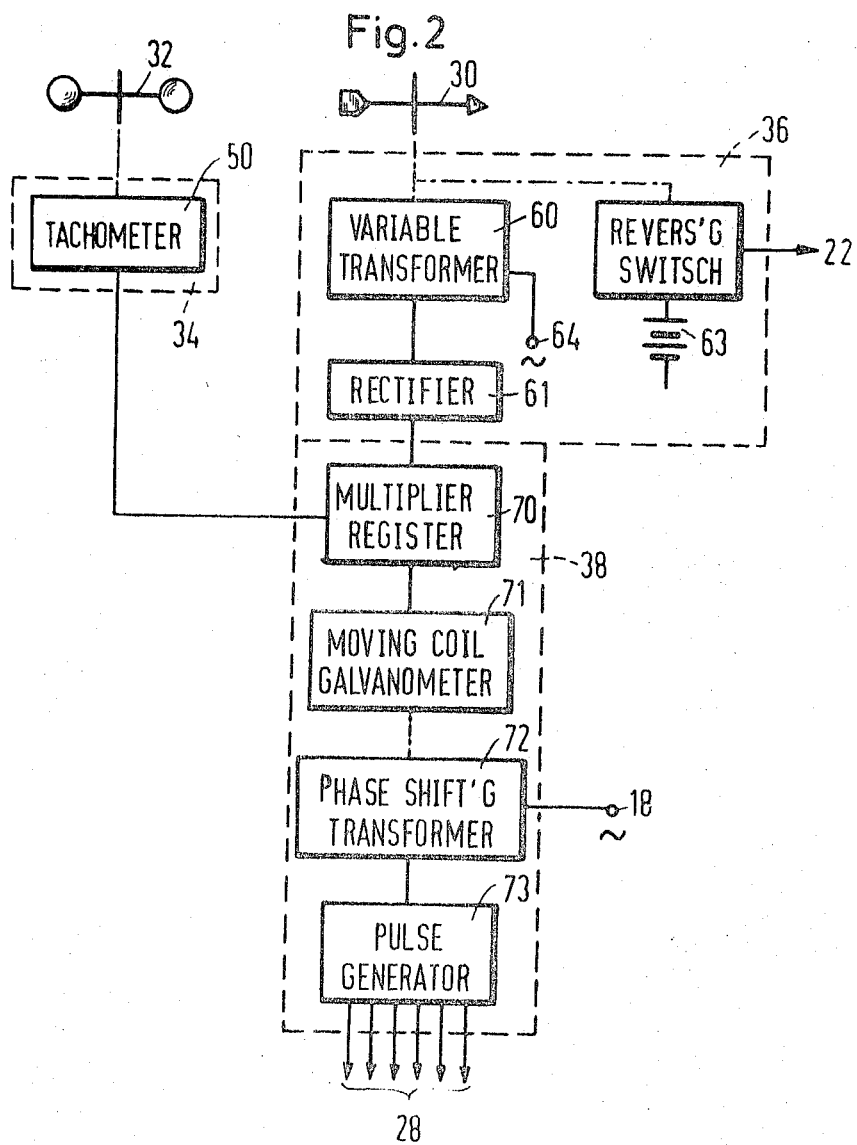

3,559,022
AUXILIARY DRIVE ARRANGEMENT FOR VEHICLES OPERATING UNDER WIND PRESSURE
Hans Tax, 3 Potsdamer Strasse, 8 Munich 23, Germany
Filed Feb. 1, 1968, Ser. No. 702,344
Claims priority, application Germany, Feb. 6, 1967,
T 33,153
Int. Cl. H02p 7/28
U.S. Cl. 318—436  7 Claims

ABSTRACT OF THE DISCLOSURE

Auxiliary traction force is exerted on a traveling crane in a direction to oppose wind pressure by a reversible electric induction motor having a wound rotor and a variable resistance arrangement in circuit with the rotor windings. A vane and an anemometer are connected by transducers to the multiplier register of a computer which controls the resistance in the rotor circuit in proportion to the vector of the wind velocity in the path of the crane travel. The motor rotates in a direction determined by that of the vector, whereby the effects of wind pressure on the rate of crane travel against the wind or with the wind may be compensated for.

BACKGROUND OF THE INVENTION

This invention relates to vehicles intended to operate under wind pressure, and particularly to an auxiliary drive arrangement automatically compensating the effects of wind pressure on the rate of movement of the vehicle which is provided with a principal drive for moving it in a desired path.

The problem with the solution of which this invention is concerned will be discussed hereinafter mainly with reference to a traveling crane, more particularly to a traveling bridge crane, for the purpose of illustration, and it will be understood that the invention is not limited to a specific vehicle.

Bridge cranes usually travel on two transversely spaced parallel tracks by means of sets of wheels mounted at the base of two upright columns whose tops are connected by a bridge. A motor mounted in each column is connected with at least one wheel of the associated set, and the motors are jointly controlled from the cab of the crane operator on the bridge to move the crane at a relatively slow pace, a few miles per hour, along the tracks. The traction force required is relatively small because a high rate of acceleration is not called for.

The crane, while very narrow in a vertical plane parallel to its path, presents broad faces in that direction, and wind blowing against the forward face may readily exert a force of the same order of magnitude as the traction force required in the absence of wind. This force is particularly great if the lattice girder structure of the crane is enclosed in a casing which protects the load bearing structure against corrosion, as is otherwise desirable. Bridge cranes intended to operate under wind pressure are therefore usually provided with oversized traction motors capable of overcoming head winds, and with brakes for reducing the undesired accelerating effect of tail winds, thus permitting the crane operator to compensate for the wind pressure on the broad crane faces.

The object of the invention is the provision of an automatic system which compensates for the effects of wind on the bridge crane or on a like vehicle without the intervention of an operator.

SUMMARY OF THE INVENTION

In one of its aspects, the invention provides a vehicle intended to be moved in a fixed path under wind pressure with a sensing device for sensing the direction of the wind, and with an auxiliary drive arrangement which exerts driving force on the vehicle in response to the sensed wind direction in such a direction as to urge the vehicle in its path in opposition to the wind pressure, that is forward against head winds, and rearward against tail winds, while the vehicle is being driven forward by its main drive.

The vehicle is preferably further provided with means for monitoring the velocity of the wind, and the magnitude of the driving force exerted by the auxiliary drive arrangement is controlled in response to the monitored velocity, and preferably in response to the component of the wind velocity in the path in which the vehicle is being moved by its main drive.

Other features, additional objects, and many of the attendant advantages of this invention will readily become apparent from the following detailed description of a preferred embodiment when considered in connection with the appended drawing.

BRIEF DESCRIPTION OF THE DRAWING

In the drawing:
FIG. 2 shows a portion of the arrangement of FIG. 1 in greater detail in a block digaram.

DESCRIPTION OF THE PREFERRED EMBODIMENT

Figure 1:
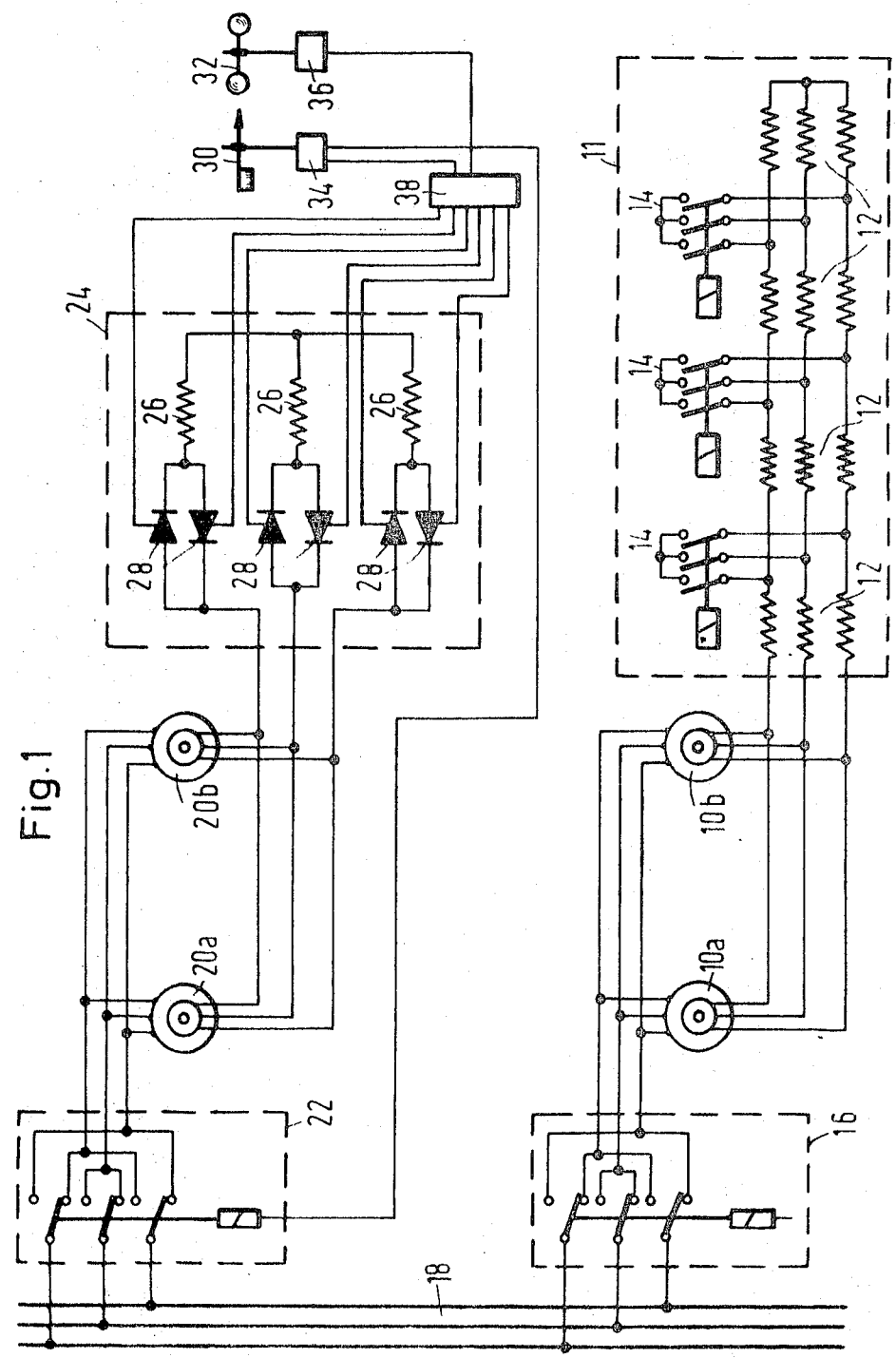
FIG. 1 is a schematic of a drive arrangement of the invention.

The drawing illustrates the electric traction system of a bridge crane, not otherwise illustrated and equipped with a wind-controlled auxiliary drive of the invention. The two principal traction motors 10a, 10b will be understood to be mounted respectively in the two upright portions of the crane which travel on respective spacedly juxtaposed tracks, as is conventional.

The motors 10a, 10b are three-phase induction motors with wound or slipring rotors whose armature and field winding terminals are connected in parallel. The rotor windings of the motors are connected to a starting circuit 11 which consists of three groups of four series-connected resistors 12, the groups being arranged in a Y-circuit. The 3-pole contactors 14 permit the second, third, and fourth resistors of the several groups to be shunted stepwise. The field windings of the motors 10a, 10b may be connected to a three-phase power line by a reversing contactor 16.

Two auxiliary traction motors 20a, 20b, respectively provided on the two upright portions of the crane have rotor and field windings which are arranged in parallel as described with reference to the principal motor 10a, 10b, and their field windings are connected with the three-phase power line by a reversing contactor 22. Their rotor windings are connected to a power control arrangement 24 which essentially consists of a Y-circuit in which each branch has a fixed resistor 26 connected in series with a pair of unidirectional thyristors 28 arranged in parallel circuit with reversed polarity. The time at which the thyristors 28 become conductive is determined by triggering pulses and supplied to the thyristor gates by an analog computer 38. Because each thyristor passes heavy current in one direction only, the thyristors 28 are arranged in pairs with reversed polarity for switching the flow of controlled alternating current through each branch of the power control arrangement.

The signal for controlling the magnitude and the direction of the driving force exerted by the auxiliary motors 20a, 20b, on the bridge crane is derived from the wind velocity and from the component of the wind direction which is parallel to the direction of movement of the crane.

As shown in FIG. 1, a movable vane 30 is exposed to the wind on top of the bridge crane and connected to a transducer assembly 34 which generates an electric signal of a strength proportional to the component of the wind parallel to the path of crane travel, as will presently be described in more detail. The signal is fed to the analog computer 38. The velocity of the wind is simultaneously monitored by a Robinson anemometer 32 connected to a transducer assembly 36. The analog computer 38 supplies the thyristors 28 with triggering pulses of the same frequency as that of the current induced in the rotor windings, but shifted in phase in response to the sensed wind properties relative to the phase of the alternating potential applied to the anodes and cathodes of the thyristors. The trigger timing of the thyristors 28, and the mean resistance value of the power control arrangement 24 are thereby controlled.

The computer 38, its input circuits, and related elements are shown in more detail in the block diagram of FIG. 2. A mechanical linkage connects the vane 30 to a reversing switch 62 arranged in the coil circuit of the reversing contactor 22 in series with a direct current source 63. When the wind blows from 180° of the horizon toward which one broad face of the bridge crane is directed, the motors 20a, 20b are energized to turn in one direction, and they are energized to turn in the opposite direction when the wind blows from the other 180° of the horizon against the other broad face of the crane.

The transducer assembly 34 consists essentially of an electric tachometer 50 whose output voltage is proportional to the rotary speed of the anemometer 22 which is mounted on the tachometer shaft high on the crane bridge.

The transducer assembly 36 includes a variable transformer 60 having a movable coil mechanically linked to the vane 30 and a fixed coil in which the movable coil is mounted in a conventional manner. One of the coils is energized by an alternating voltage source 64, so that the induced current in the other coil is proportional to the cosine of the angle defined by the two coils. The induced alternating current is rectified in a rectifier 61, and the resulting potential is applied to a multiplier register 70 in the computer 38 which also receives the output of the tachometer 50, and generates a signal proportional to the product of the two input voltages.

The product signal is fed to a moving coil galvanometer 71 mechanically coupled to a three-phase phase shifting transformer 72 of the type having a stator and a rotor angularly displaceable relative to the stator. The stator carries the three primary windings, and the rotor the three secondary windings of the transformer. The transformer is connected to the three-phase power line 18 and the three-phase current delivered from the secondary windings of the transformer 72 is electrically shifted in phase by an angle proportional to the angular mechanical displacement of the coil in the galvanometer 71.

The three output leads of the transformer 72 are connected to three separate sections of a pulse generator 73 in which pulses are generated in response to the reversal of polarity of the exciting current, a positive pulse being generated in response to a voltage change from negative to positive, and vice versa. The pulses generated are transmitted from the generator 73 to the gate terminals of the thyristors 28, the positive pulses being effectively applied to one thyristor of each pair, and the negative pulses to the other.

Line current is thereby supplied to the auxiliary traction motors 20a, 20b in a direction which is controlled by the direction of the prevailing wind to urge the crane against the wind, and at a power level which is controlled by the magnitude of the component of the wind velocity in the direction of crane movement. The motors 20a, 20b are respectively coupled to the same wheels or sets of wheels of the crane as the motors 10a, 10b, and thus assist the principal motors to move the crane into the wind while resisting movement of the crane with the wind. The motors 10a, 10b are controlled manually from the non-illustrated cab of the crane by an operator who energizes the contactors 14, 16 as needed. The effects of wind pressure on the crane movement are compensated for automatically.

While the invention has been described with reference to a bridge crane having an electric traction system, it will be appreciated that it is used to advantage in other vehicles traveling at a low speed of a few miles an hour and subject to the pressure of much faster winds. The nature of the principal source of traction power is not relevant to the invention, and the crane described hereinabove may have a diesel or steam engine as a principal traction motor without otherwise affecting the operation of the auxiliary drive apparatus with which this invention is mainly concerned. Actually, principal traction may be supplied by one or more tractors quite independently of the wheels on which the crane travels, and the auxiliary traction apparatus of the invention may act on caterpillar tracks of the crane or other wheel substitutes if the vehicle is so equipped.

It should be understood, therefore, that the foregoing disclosure relates only to a preferred embodiment of the invention, and that it is intended to cover all changes and modifications of the example of the invention herein chosen for the purpose of the disclosure which do not depart from the spirit and scope of the invention set forth in the appended claims.

What is claimed is:

1. In a vehicle including wheel means and drive means for moving the vehicle on said wheel means in a fixed path, the vehicle being intended for use under wind pressure, the improvement which comprises:
   (a) sensing means for sensing the direction of wind exerting pressure on said vehicle;
   (b) auxiliary drive means for exerting driving force on on said wheel means in response to the sensed wind direction in a direction to urge the vehicle to move in said path in oppsition to said wind pressure;
   (c) monitoring means for monitoring the velocity of said wind; and
   (d) control means operatively connected to said monitoring means for controlling the magnitude of said driving force in response to the monitored velocity.

2. In a vehicle as set forth in claim 1, said auxiliary drive means including an electric motor and reversing means for reversing the direction of the output of said motor, and said sensing means including vane means mounted on said vehicle and exposed to said wind for movement thereby.

3. In a vehicle as set forth in claim 1, said control means being operatively connected to said sensing means for determining the component of said wind velocity in the direction of said path, and for generating a control signal in response to the determined component, the magnitude of said driving force being varied in response to said signal.

4. In a vehicle as set forth in claim 3, said auxiliary drive means including an electric induction motor having a wound rotor and said control means further including variable resistor means in circuit with the rotor winding for varying the resistance of said circuit to the flow of current induced therein in response to said control signal.

5. In a vehicle as set forth in claim 4, said resistor means including fixed resistance means in series circuit with switch means for opening and closing said series cirucit at the frequency of said induced current and with a variable phase shift, the magnitude of said phase shift being varied in response to said control signal.

6. In a vehicle as set forth in claim 5, said switch means including two unidirectional thyristors arranged in parallel and with opposite polarities.

7. In a vehicle as set forth in claim 3, first transducer means interposed between said control means and said sensing means for generating a first electrical signal responsive to the angle defined by said wind direction and said path, second transducer means interpose between said control means and said monitoring means for generating a second electrical signal responsive to said velocity, said control means including computer means having an input receiving said first and second signals and generating said control signal.

References Cited

UNITED STATES PATENTS

| 1,315,647 | 9/1919 | Taplin | 244—82 |
| 2,182,624 | 12/1939 | Dreyer | 318—436 |
| 2,962,243 | 11/1960 | Coleman | 244—82 |
| 3,172,079 | 3/1965 | Gunson | 244—82 |
| 3,319,594 | 5/1967 | Gianoli | 244—82 |

ORIS L. RADER, Primary Examiner

A. G. COLLINS, Assistant Examiner

U.S. Cl. X.R.

318—481